United States Patent
Griffioen

(10) Patent No.: US 10,785,737 B2
(45) Date of Patent: Sep. 22, 2020

(54) TECHNIQUE TO ALIGN A RADIO INTERFACE FRAME TIMING REFERENCE IN A POOL OF RADIO EQUIPMENT CONTROLLERS

(71) Applicant: Telefonaktiebolaget LM Ericsson (publ), Stockholm (SE)

(72) Inventor: Robert Griffioen, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 15/770,940

(22) PCT Filed: Nov. 2, 2015

(86) PCT No.: PCT/IB2015/058476
§ 371 (c)(1),
(2) Date: Apr. 25, 2018

(87) PCT Pub. No.: WO2017/077361
PCT Pub. Date: May 11, 2017

(65) Prior Publication Data
US 2018/0324726 A1    Nov. 8, 2018

(51) Int. Cl.
*H04W 56/00* (2009.01)
*H04W 88/08* (2009.01)
(Continued)

(52) U.S. Cl.
CPC ............. *H04W 56/004* (2013.01); *H04J 3/06* (2013.01); *H04W 56/0055* (2013.01);
(Continued)

(58) Field of Classification Search
None
See application file for complete search history.

(56) References Cited

U.S. PATENT DOCUMENTS 6,628,697 B1    9/2003  Douglas et al.
7,646,751 B2    1/2010  Osterling et al.
(Continued)

FOREIGN PATENT DOCUMENTS

CN    101982008 A    2/2011
CN    103002601 A    3/2013
(Continued)

OTHER PUBLICATIONS

Rene Moll, "ADFT Based Synchronization Scheme for Chirped Communication", Mater Thesis, Apr. 2, 2013 (Year: 2013).*
(Continued)

*Primary Examiner* — Ruihua Zhang
(74) *Attorney, Agent, or Firm* — Sage Patent Group

(57) ABSTRACT

Systems and methods of aligning a radio interface frame timing reference in a pool of Radio Equipment Controllers (RECs) are provided. In some embodiments, a method of operation of an REC includes computing a radio interface frame timing offset for a target REC relative to a reference time and 5 sending the radio interface frame timing offset to the target REC via an asynchronous communication network. According to some embodiments, this provides a substantially aligned radio interface frame timing reference in a pool of RECs. In some embodiments, the method also includes, prior to computing the radio interface frame timing offset, determining that the REC is a master REC. In some embodiments, determining that the REC is the master REC includes exchanging information indicative of at least one capability of each of the RECs and determining that the REC is the master REC based on the at least one capability.

17 Claims, 13 Drawing Sheets

(51) Int. Cl.
  *H04W 76/12* (2018.01)
  *H04J 3/06* (2006.01)
  *H04L 29/06* (2006.01)

(52) U.S. Cl.
  CPC ......... *H04W 76/12* (2018.02); *H04W 88/085* (2013.01); *H04L 63/0428* (2013.01); *H04L 63/164* (2013.01)

(56) References Cited

U.S. PATENT DOCUMENTS

| | | | |
|---|---|---|---|
| 7,773,578 | B2 | 8/2010 | Liu |
| 7,817,603 | B2 | 10/2010 | Liu |
| 7,940,667 | B1 | 5/2011 | Coady et al. |
| 8,422,484 | B2 | 4/2013 | Iwai et al. |
| 8,599,827 | B2 | 12/2013 | Irvine |
| 8,774,109 | B2 | 7/2014 | Kenington et al. |
| 8,842,649 | B2 | 9/2014 | Liu et al. |
| 9,554,347 | B2 | 1/2017 | Griffioen |
| 9,699,751 | B2 | 7/2017 | Griffioen |
| 2005/0135429 | A1* | 6/2005 | Bingham .................. G06F 1/14 370/503 |
| 2007/0058654 | A1 | 3/2007 | Arnold et al. |
| 2009/0089652 | A1 | 4/2009 | Chi et al. |
| 2009/0245228 | A1* | 10/2009 | Osterling .............. H04J 3/0638 370/350 |
| 2009/0291681 | A1 | 11/2009 | Hara |
| 2011/0310881 | A1 | 12/2011 | Kenington |
| 2011/0310941 | A1 | 12/2011 | Kenington |
| 2012/0089709 | A1* | 4/2012 | Frank ...................... G06F 1/12 709/220 |
| 2013/0100948 | A1* | 4/2013 | Irvine ................... H04J 3/0632 370/350 |
| 2014/0185601 | A1 | 7/2014 | Ilyadis |
| 2015/0229881 | A1* | 8/2015 | Choi ..................... H04N 7/148 348/14.02 |
| 2015/0304971 | A1 | 10/2015 | Shor et al. |
| 2015/0334666 | A1 | 11/2015 | Griffioen |
| 2015/0334671 | A1 | 11/2015 | Griffioen |
| 2017/0064653 | A1 | 3/2017 | Griffioen |
| 2017/0064661 | A1* | 3/2017 | Katagiri ............ H04W 56/0045 |
| 2017/0208473 | A1* | 7/2017 | Chen ..................... H04J 3/0661 |

FOREIGN PATENT DOCUMENTS

| | | | |
|---|---|---|---|
| EP | 1630979 | A1 | 3/2006 |
| EP | 1744572 | A1 | 1/2007 |
| EP | 2234442 | A2 | 9/2010 |
| EP | 2367311 | A2 | 9/2011 |
| WO | 2006040653 | A1 | 4/2006 |
| WO | 2009089652 | A1 | 7/2009 |
| WO | 2013070613 | A1 | 5/2013 |
| WO | 2013189553 | A1 | 12/2013 |
| WO | 2014005759 | A1 | 1/2014 |
| WO | 2015001389 | A1 | 1/2015 |
| WO | 2015173754 | A1 | 11/2015 |
| WO | 2015173758 | A1 | 11/2015 |
| WO | 2015173772 | A1 | 11/2015 |

OTHER PUBLICATIONS

Non-Final Office Action for U.S. Appl. No. 15/307,973, dated Apr. 30, 2018, 30 pages.
Author Unknown, "Common Public Radio Interface (CPRI); Interface Specification," CPRI Specification, V1.4, Mar. 31, 2006, 64 pages.
Author Unknown, "Common Public Radio Interface (CPRI); Interface Specification," CPRI Specification V2.0, Oct. 1, 2004, 75 pages.
Author Unknown, "Common Public Radio Interface (CPRI); Interface Specification," CPRI Specification, V4.0, Jun. 30, 2008, 96 pages.
Benesty, Jacob, et al., "Time Delay Estimation via Minimum Entropy," IEEE Signal Processing Letters, vol. 14, No. 3, Mar. 2007, pp. 157-160.
Non-Final Office Action for U.S. Appl. No. 14/491,129, dated Mar. 10, 2016, 14 pages.
Non-Final Office Action for U.S. Appl. No. 14/491,129, dated Oct. 21, 2016, 22 pages.
Notice of Allowance and Examiner-Initiated Interview Summary for U.S. Appl. No. 14/491,129, dated Apr. 26, 2017, 19 pages.
International Search Report and Written Opinion for International Patent Application No. PCT/IB2015/053539, dated Aug. 27, 2015, 13 pages.
International Preliminary Report on Patentability for International Patent Application No. PCT/IB2015/053539, dated Nov. 24, 2016, 9 pages.
Non-Final Office Action for U.S. Appl. No. 15/307,973, dated Jul. 3, 2017, 18 pages.
Final Office Action for U.S. Appl. No. 15/307,973, dated Jan. 11, 2018, 20 pages.
Advisory Action for U.S. Appl. No. 15/307,973, dated Apr. 4, 2018, 3 pages.
International Search Report and Written Opinion for International Patent Application No. PCT/IB2015/053571, dated Aug. 27, 2015, 14 pages.
International Preliminary Report on Patentability for International Patent Application No. PCT/IB2015/053571, dated Nov. 24, 2016, 10 pages.
International Search Report and Written Opinion for International Patent Application No. PCT/IB2015/058476, dated Jul. 26, 2016, 12 pages.
Non-Final Office Action for U.S. Appl. No. 14/277,228, dated Mar. 11, 2016, 11 pages.
Notice of Allowance for U.S. Appl. No. 14/277,228, dated Nov. 23, 2016, 5 pages.
International Search Report and Written Opinion for International Patent Application No. PCT/IB2015/053535, dated Aug. 27, 2015, 10 pages.
International Preliminary Report on Patentability for International Patent Application No. PCT/IB2015/053535, dated Nov. 24, 2016, 8 pages.
Chinese Search Report for Chinese Application No. CN 201580085643.3 dated May 15, 2019—4 Pages.

* cited by examiner

TECHNIQUE TO ALIGN A RADIO INTERFACE FRAME TIMING REFERENCE IN A POOL OF RADIO EQUIPMENT CONTROLLERS

This application is a 35 U.S.C. § 371 national phase filing of International Application No. PCT/IB2015/058476, filed Nov. 2, 2015, the disclosure of which is incorporated herein by reference in its entirety.

TECHNICAL FIELD

The present disclosure relates to cellular communication networks and more particularly relates to compensation of radio equipment processing delays.

BACKGROUND

In wireless, or cellular, communication networks, it is important that the downlink and uplink frame timing be synchronized between a base station and mobile devices served by the base station. The mobile devices connected to the base station use the same transmit and receive frequencies.

To ensure that there is no interference between the mobile devices, the mobile devices are assigned time slots or sub-channel frequencies depending on the type of multiplexing (e.g., Time Division Duplex (TDD) or Frequency Division Duplex (FDD)). In either case, frame timing must be precisely maintained over radio links between the base station and the mobile devices.

As shown in FIG. 1, within a base station, timing must be aligned between a Radio Equipment Controller (REC) 10 and a Radio Equipment (RE) 12 such that the first sample of the Downlink (DL) radio frame is transmitted into the air, i.e., reaches an Antenna Reference Point (ARP) 14, substantially at the same time as the REC's transmit Basic Frame Transmit Reference Point (BFN@TRP) 16. Specifically, the following events all happen substantially simultaneously: the REC's downlink and uplink internal frame timing reference (BFN@TRP), downlink frame (e.g., Common Public Radio Interface (CPRI) downlink frame) starts from the REC 10; the uplink frame (e.g., CPRI uplink frame) arrives at the REC 10, the downlink radio frame leaves the ARP; and the uplink radio frame arrives at the ARP. The allowed timing error in the radio can be, for example, 20 nanoseconds (ns). This means that the first sample may reach the ARP 14 at the BFN@TRP 16 with a ±20 ns delay.

On the Uplink (UL), the first sample of the UL radio frame is the one received at the ARP 14 at the BFN@TRP. The allowed timing error in the radio can also be 20 ns. This means that the sample marked by the radio as the first in the UL radio frame must have entered the ARP 14 at the BFN@TRP±20 ns.

For DL path delay compensation, the REC 10 advances the DL baseband data such that it arrives at the radio's ARP 14 point precisely when it starts out at the REC's transmit reference point 16 (BFN@TRP). The REC 10 computes the compensation using the measured DL delay to the radio and the radio DL processing delay the REC 10 receives from the radio during Common Public Radio Interface (CPRI) path setup.

For the UL path delay compensation, the radio uses path delay information received from the REC 10 and the radio's internal UL processing delay to advance the CPRI data such that the arrival time of this UL data is aligned with the outbound data. It is up to the radio to provide further internal timing compensation for each carrier and account for variations due to frequency, operating temperature, and component age on both the UL and DL data paths.

During radio production, both the DL and UL data paths must be precisely calibrated for timing alignment. The in-equipment delay, or $T_{OFFSET}$, obtained at production and stored at each radio is then used for the synchronization process. For this to work, a large amount of delay calibration data must be stored in non-volatile memory. A radio must be re-calibrated after factory repairs, and this process is complex and time consuming. In addition, with change in frequency, temperature, and component aging, the stored in-equipment delay can change, which results in timing errors. Although the equipment is designed to allow certain timing errors, wide variations can still occur. If such large variations occur, further calibration is required in the field, which is expensive, time consuming, and introduces maintenance problems.

Additionally, RECs and REs have become increasingly powerful. There are situations when one or more RECs may be able to control multiple REs and/or multiple RECs may control the same one or more REs. In these situations, synchronized timing is still very important but is much more difficult to achieve. Thus, multiple RECs that work together in some way, referred to herein also as a pool of RECs, must be substantially synchronized. As such, there is a need for a way to align a radio interface frame timing reference in a pool of RECs.

SUMMARY

Systems and methods of aligning a radio interface frame timing reference in a pool of Radio Equipment Controllers (RECs) are provided. In some embodiments, a method of operation of an REC includes computing a radio interface frame timing offset for a target REC relative to a reference time for the RECs and the target REC and sending the radio interface frame timing offset to the target REC via an asynchronous communication network. In some embodiments, this reference time is the radio interface framing timing of the REC. In some embodiments, this reference time is determined in another node and provided to the REC. According to some embodiments, this provides a substantially aligned radio interface frame timing reference in a pool of RECs.

In some embodiments, the method also includes, prior to computing the radio interface frame timing offset, determining that the REC is a master REC. In some embodiments, determining that the REC is the master REC includes exchanging information indicative of at least one capability of each of the RECs and determining that the REC is the master REC based on the at least one capability.

In some embodiments, determining that the REC is the master REC includes receiving an indication that the REC is the master REC. In some embodiments, determining that the REC is the master REC includes exchanging information indicative of at least one capability of each of the RECs with the at least one other REC; determining that the REC is not the master REC based on the at least one additional capability; exchanging additional information indicative of at least one additional capability of each of the RECs; and determining that the REC is the master REC based on the at least one additional capability.

In some embodiments, the method also includes determining if an additional REC should be time-aligned. If an additional REC should be time-aligned, the method includes computing a radio interface frame timing offset for the additional REC and sending the radio interface frame timing offset to the additional REC via the asynchronous communication network.

In some embodiments, the method also includes determining if an interval timer has expired. If the interval timer has expired, the method includes computing an updated radio interface frame timing offset for the target REC and sending the updated radio interface frame timing offset to the target REC via the asynchronous communication network. In some embodiments, the interval timer is 1 second.

In some embodiments, computing the radio interface frame timing offset for the target includes transmitting to the target REC a synchronization signal over the asynchronous communication network as modulated IQ data; receiving from the target REC a synchronization signal over the asynchronous communication network plus a computed radio interface timing offset from the master REC which includes a transit delay to the target REC and a radio interface frame offset; correlating a reference synchronization signal and a received signal from the target REC to compute a transit delay to the target REC; and transmitting to the target REC a radio interface frame offset over the asynchronous communication network.

In some embodiments, an REC includes a communication interface configured to communicatively couple the REC to at least one other REC and a Radio Equipment (RE) via an asynchronous communication network and circuitry. The circuitry is configured to compute a radio interface frame timing offset for a target REC of the at least one other REC and send the radio interface frame timing offset to the target REC via the asynchronous communication network. In some embodiments, the circuitry is further configured to perform one or more steps of any of the methods discussed above.

In some embodiments, an REC includes a radio interface frame timing offset module operative to compute a radio interface frame timing offset for a target REC of at least one other REC and a transmission module operative to send the radio interface frame timing offset to the target REC via an asynchronous communication network.

In some embodiments, a method of operation of an REC includes receiving a radio interface frame timing offset via an asynchronous communication network and adjusting a radio interface frame timing of the REC based on the received radio interface frame timing offset.

In some embodiments, the method also includes, prior to receiving the radio interface frame timing, selecting a master REC from the at least one other REC. In some embodiments, selecting the master REC includes exchanging information indicative of at least one capability of each of the RECs and selecting the master REC based on the at least one capability. In some embodiments, the method also includes transmitting an indication to the master REC indicating that the master REC is the master REC.

In some embodiments, the method also includes determining if the master REC has become unavailable and, if the master REC has become unavailable, selecting a new master REC from the RECs.

In some embodiments, the method also includes, prior to receiving the radio interface frame timing offset, receiving, from the master REC, a synchronization signal over the asynchronous communication network as modulated IQ data; correlating a reference synchronization signal and a received signal from the master REC on the asynchronous communication network, the received signal including the synchronization signal; computing a radio interface timing offset which includes a transit delay and a radio interface frame timing offset based on a phase shift between the two signals; and transmitting to the master REC a synchronization signal over the asynchronous communication network plus the computed radio interface timing offset.

In some embodiments, an REC includes a communication interface configured to communicatively couple the REC to at least one other REC and an RE via an asynchronous communication network and circuitry. The circuitry is configured to: receive a radio interface frame timing offset from a master REC via the asynchronous communication network and adjust a radio interface frame timing of the REC based on the received radio interface frame timing offset. In some embodiments, the circuitry is further configured to perform one or more steps of any of the methods discussed above.

In some embodiments, an REC includes a radio interface frame timing offset module operative to receive a radio interface frame timing offset from a master REC via an asynchronous communication network and an adjustment module operative to adjust a radio interface frame timing of the REC based on the received radio interface frame timing offset.

In some embodiments, a method of time-aligning RECs includes computing, by the master REC, a radio interface frame timing offset for a target REC of the at least one other REC; sending, by the master REC, the radio interface frame timing offset to the target REC via an asynchronous communication network; and adjusting, by the target REC, a radio interface frame timing of the target REC based on the received radio interface frame timing offset.

In some embodiments, the radio interface frame timing offset is a Common Public Radio Interface, CPRI, frame timing offset. In some embodiments, at least one of the synchronization signals is a chirped sine wave. In some embodiments, the chirped sine wave has a frequency that varies substantially continuously. In some embodiments, the chirped sine wave has a frequency and amplitude that are stepped.

In some embodiments, the asynchronous communication network is an Ethernet network. In some embodiments, the Ethernet network includes an Internet Protocol Security (IPsec) tunnel.

In some embodiments, a computer program includes instructions which, when executed on at least one processor, cause the at least one processor to carry out any of the methods discussed above. In some embodiments, a carrier contains the computer program. The carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, definitions of a few terms used throughout this description are beneficial. As used herein, a "chirped sine wave" or "chirp sine wave" is a signal which varies from a low frequency to a higher frequency. For example, in some embodiments, a chirped sine wave varies (e.g., linearly or exponentially) from, for example, 100 kilohertz (kHz) to 1 Megahertz (MHz). In some embodiments, the chirped sine wave has a frequency and amplitude that are stepped.

"Cross-correlation" (C-C) is a signal processing technique used to measure similarity between two wave forms as a function of a time-lag applied to one of them. For example, in some embodiments, cross-correlation is used to measure a delay between a chirped sine wave signal and a reference chirped sine wave signal with a resolution of, e.g., ±1 nanoseconds (ns).

An industry group has developed a standardized protocol for the REC/RE interface called Common Public Radio Interface (CPRI). CPRI is partitioned into the following data flows: control plane, management plane, synchronization plane, and user plane. The user plane transfers the baseband; other flows are overhead. Comprehensive details regarding the CPRI specification are available in the interface specification document entitled, *Common Public Radio Interface (CPRI); Interface Specification*, V6.0 (2013 Oct. 30).

The CPRI specification provides for the sort of precision and deterministic timing needed to transfer downlink data, timing, and control information from an REC to an RE and, conversely, transfer uplink data and control information from the RE to the REC. CPRI also provides for control and timing between an REC and two or more daisy-chained REs. Yet the CPRI protocol must be understood as a dedicated link; it is specialized for use in linking network nodes in the wireless communication network environment and it is not particularly robust with respect to transport impairments on the point-to-point links. In general, the specification assumes the use of synchronous, dedicated communication links between RECs and REs.

While several embodiments refer to CPRI timing, the concepts described are applicable to other current or future radio interfaces.

Figure 1:
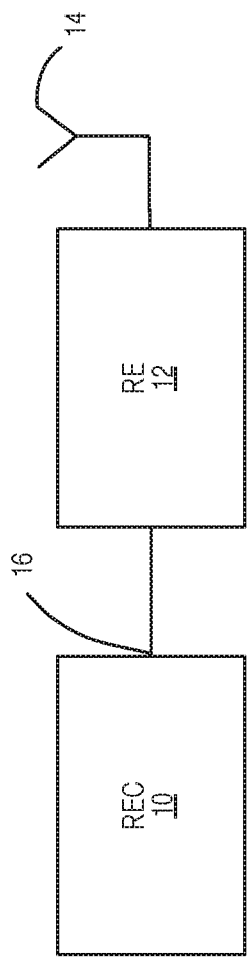
FIG. 1 is a block diagram of a typical base station which is typically comprised of a Radio Equipment Controller (REC) and a Radio Equipment (RE)

As indicated previously with reference to FIG. 1, in order to maintain precise frame timing, a number of delays are determined. The particular delays can be described as follows in relation to FIG. 2. According to the Common Public Radio Interface (CPRI) specification, a base station 20 includes a Radio Equipment Controller (REC) 22 and a Radio Equipment (RE) 24. The REC 22 is typically connected to the RE 24 via one or more cables, such as one or more fiber cables. The REC 22 includes radio functions in the digital baseband domain, whereas the RE 24 includes analog radio frequency functions. A generic interface between the REC 22 and the RE 24, which is referred to herein as a CPRI interface, enables communication between the REC 22 and the RE 24.

Figure 2:
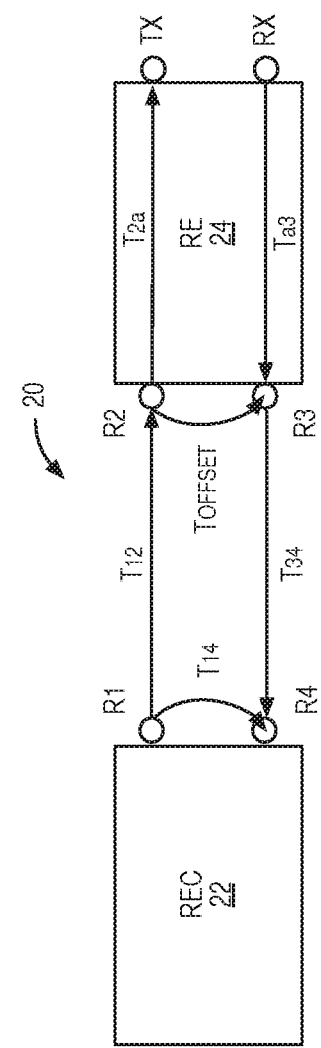
FIG. 2 is a block diagram of the base station of FIG. 1, along with various delays accounted for during conventional synchronization.

In order to maintain precise frame timing, a number of delays are determined. Specifically, as shown in FIG. 2, these delays include:

$T_{12}$: Cable delay ($T_{12}$) is a delay between an output interface (R1) of the REC 22 and an input interface (R2) of the RE 24 due to a cable connecting the output interface (R1) of the REC 22 to the input interface (R2) of the RE 24, $T_{OFFSET}$: In-equipment delay ($T_{OFFSET}$) is an internal delay of the RE 24 from the input interface (R2) of the RE 24 to an output interface (R3) of the RE 24, $T_{34}$: Cable delay ($T_{34}$) is a delay from the output interface (R3) of the RE 24 to an input interface (R4) of the REC 22 due to a cable connecting the output interface (R3) of the RE 24 to the input interface (R4) of the REC 22, $T_{14}$: Total round-trip delay ($T_{14}$) that is the sum of $T_{12}$, $T_{OFFSET}$, and $T_{34}$, $T_{2a}$: In-equipment downlink delay ($T_{2a}$) is an internal delay of the RE 24 from the input interface (R2) of the RE 24 to a Transmit Port (TX) or antenna of the RE 24, and $T_{a3}$: In-equipment uplink delay ($T_{a3}$) is an internal delay of the RE 24 from a Receive Port (RX) or antenna of the RE 24 to the output interface (R3) of the RE 24.

In operation, the RE 24 obtains the in-equipment delay ($T_{OFFSET}$), the in-equipment downlink delay ($T_{2a}$), and the in-equipment uplink delay ($T_{a3}$) and reports those estimates to the REC 22. The cable delays ($T_{12}$ and $T_{34}$) are then determined by the REC 22 using a synchronization process.

For the synchronization process, the REC 22 transmits a sync byte, which is referred to as a K28.5 sync byte in the CPRI specification, from the output interface (R1) of the REC 22 to the input interface (R2) of the RE 24. The RE 24 then passes the sync byte from the input interface (R2) of the RE 24 to the output interface (R3) of the RE 24 such that the sync byte is looped-back to the REC 22. Using the sync byte, the REC 22 measures the total round-trip delay ($T_{14}$), which is the amount of time between a time at which the sync byte was sent from the output interface (R1) of the REC 22 and a time at which the sync byte was received at the input interface (R4) of the REC 22. Then, the REC 22 computes the cable delays ($T_{12}$ and $T_{34}$) as:

$$T_{12} = T_{34} = \frac{(T_{14} - T_{OFFSET})}{2}$$

where $T_{14}$ is the total round-trip delay measured by the REC 22 using the sync byte.

Figure 3:
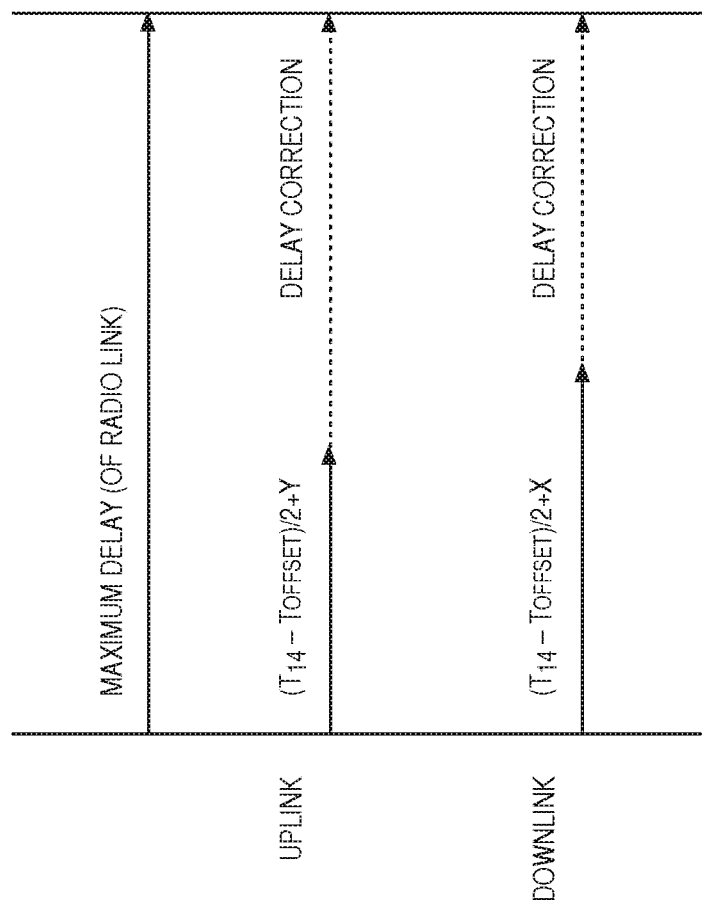
FIG. 3 illustrates a base station correction delay mismatch.

With reference to FIG. 3, the base station delays and required corrections are shown. As illustrated above, the base station 20 computes the connection cable delay using ($T_{14}$−$T_{OFFSET}$)/2. The reported in-equipment delay and connection cable delay values are then used to compute the buffering to align the uplink and downlink frames over the CPRI link. The base station 20 corrects for the uplink and downlink mismatch. The Y (uplink in-equipment delay) and X (downlink in-equipment delay) are aligned using buffers inside the base station 20.

Figure 4:
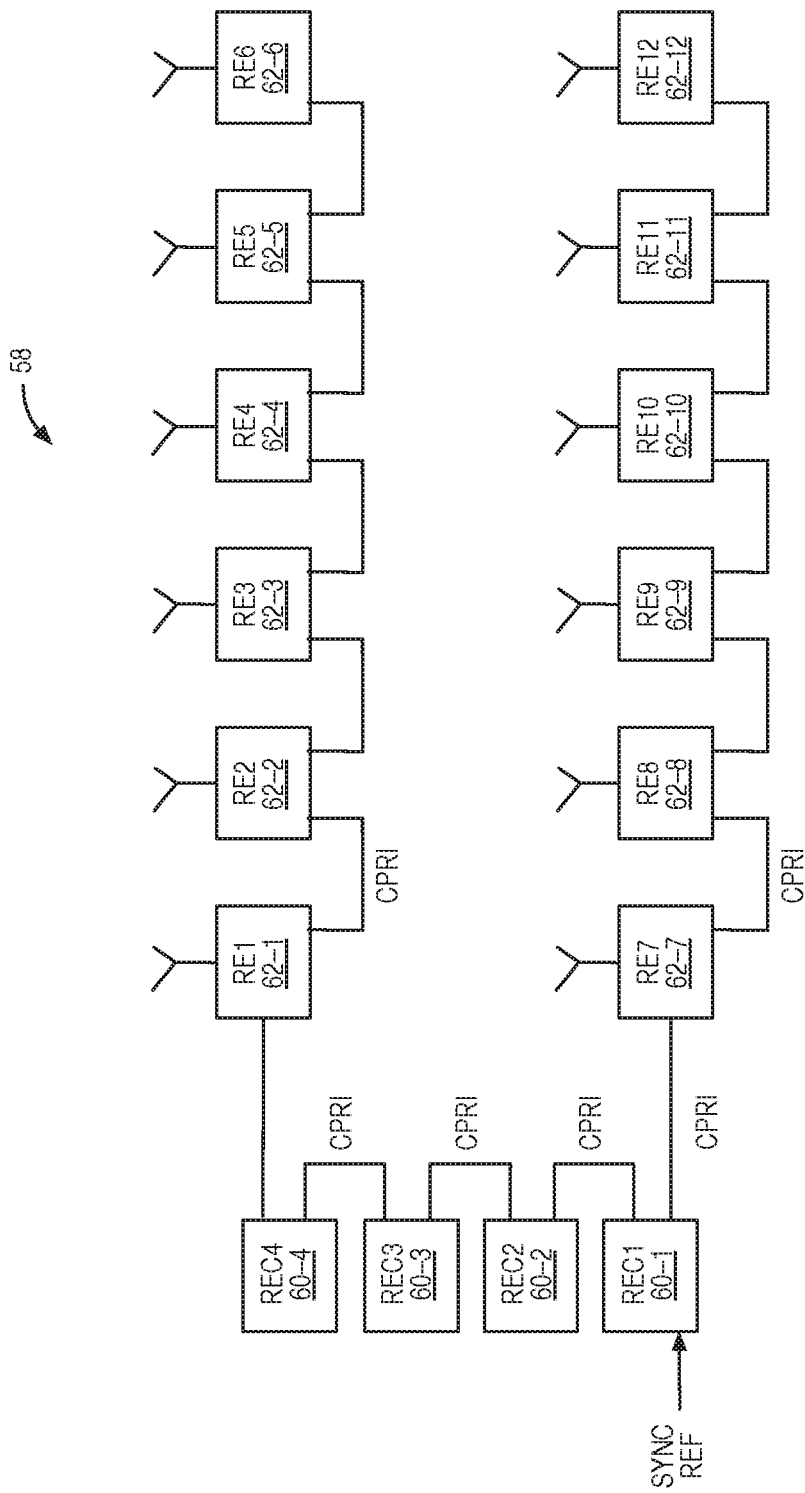
FIG. 4 illustrates a base station with multiple RECs and REs according to some embodiments of the present disclosure.

FIG. 4 illustrates a base station 58 with multiple RECs 60 and REs 62 according to some embodiments of the present disclosure. In one example implementation, the allowed time error tolerance in the base station is summarized as:

| Tolerance | Node element |
| --- | --- |
| +/−10 ns | REC interface |
| +/−15 ns | RE interface |
| +/−35 ns | Path delay compensation |
| +/−30 ns | Path regulation and timing |

In this example, the REC interface tolerance is a factory delay measurement tolerance between the BFN@TRP to the REC's CPRI port; the RE interface tolerance is the factory delay measurement tolerance between the RE's CPRI port and the RE's Antenna Reference Point (ARP); the path delay compensation tolerance is the base station's end-to-end delay compensation tolerance for each cascaded path between a REC and the destination RE; and the path regulation and timing tolerance is the maximum allowable variation in timing compensation due to jitter on the CPRI interfaces between a RCE and a particular RE over cascaded paths.

FIG. 4 illustrates the base station 58 where the components are directly connected and are collocated including multiple RECs 60-1 through 60-4 and multiple REs 62-1 through 62-12 connected in a cascade arrangement. The RECs 60-1 through 60-4 are generally referred to collectively as RECs 60 and individually as REC 60. Likewise, the REs 62-1 through 62-12 are generally referred to herein collectively as REs 62 and individually as RE 62. The RECs 60 and the REs 62 are connected via cables (e.g., optical cables) and communicate according to, in the exemplary embodiments described herein, the CPRI protocol.

In this cascade arrangement, the end-to-end uplink and downlink path delays between each REC 60 and each RE 62 are needed in order to provide proper time alignment of uplink and downlink radio frames. As discussed below in detail, in order to measure the end-to-end uplink path delay between, for example, the RE 62-3 and the REC 60-1, the RE 62-3 upconverts a low frequency chirped sine wave signal to the appropriate RF interface of the RE 62-3. The upconverted chirped sine wave signal is then passed through the RF interface of the RE 62-3 such that the chirped sine wave signal is recovered at baseband and then sent to the REC 60-1 via a CPRI interface of the RE 62-3 as In-phase and Quadrature (IQ) data. The REC 60-1 cross correlates a signal received from the RE 62-3 including the chirped sine wave signal and a reference chirped sine wave signal. Based on the results of the correlation, a phase shift or difference between the two chirped sine wave signals is determined. This phase shift is converted into a time delay, which is the end-to-end uplink path delay between the RE 62-3 and the REC 60-1.

In order to measure the end-to-end downlink path delay between, for example, the REC 60-1 and the RE 62-3, the REC 60-1 injects a low frequency chirped sine wave signal into a CPRI interface of the REC 60-1 for transmission to the RE 62-3. The RE 62-3 receives a signal including the chirped sine wave signal from the REC 60-1 via its CPRI interface and passes the received signal through the RF interface of the RE 62-3 to provide an RF output signal at an RF transmit port of the RF interface. The RE 62-3 samples an RF output signal at the RF transmit port of the RE 62-3 using, e.g., an RF diode. The RE 62-3 cross correlates the samples of the RF output signal with a reference chirped sine wave signal either at RF or at baseband. A phase shift, or difference, between the two chirped sine wave signals is determined based on the results of the correlation. This phase shift is converted into a time delay, which is the downlink processing delay between the REC 60-1 and the RE 62-3.

The end-to-end uplink and downlink path delays between each REC 60 and each RE 62 can be measured in the same manner. The measurements may be made, for example, when a CPRI link to an RE 62 becomes operational and/or when an REC 60 activates a carrier for an RE 62. This measurement scheme enables measurement of the end-to-end uplink and downlink path, or processing, delays for the current operating temperature, carrier frequency, and component age. This enables an REC 60 to apply delay compensation on the downlink path to the ARP of an RE 62 and to provide the RE 62 with at least part of the uplink path delay information that the RE 62 uses to compute uplink delay compensation data correction.

Note that the RE 62 may still use one of the embodiments described above to measure and compensate for its own in-equipment uplink and downlink delays and to compute the delay adjustment that the RE 62 applies on the uplink. On the uplink path, the RE 62 advances the baseband data based on the internal processing delay of the RE 62. In this manner, the REC 60 can precisely compute the end-to-end uplink delay which does include the uplink processing delay of the RE 62. The REC 60 can then compensate fine delay for the uplink path. The same can be done for the downlink, where fine compensation of the internal radio processing delay of the RE 62 can be performed.

As RECs and REs have become increasingly powerful, there are situations when one or more RECs may be able to control multiple REs and/or multiple RECs may control the same one or more REs. In these situations, synchronized timing is important but is much more difficult to achieve. Such a pool of RECs that work together in some way must be substantially synchronized. As such, there is a need for a way to align a radio interface frame timing reference in a pool of RECs.

Figure 5:
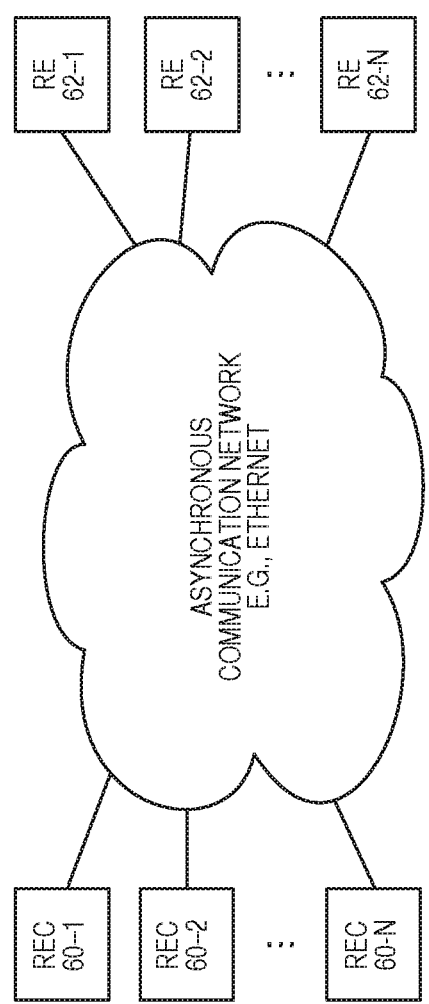
FIG. 5 illustrates multiple RECs capable of communicating with multiple REs over an asynchronous communication network, according to some embodiments of the present disclosure.

To address the issues of synchronizing such a pool of RECs, FIG. 5 illustrates a network where multiple RECs 60 and multiple REs 62 are connected via an asynchronous communication network. According to some embodiments, the use of an asynchronous communication network permits the RECs 60 to be centrally located in a network-based server farm. The REs 62 would be connected to an REC 60 via the asynchronous communication network. In some embodiments the asynchronous communication network is an Ethernet network. Further, in some embodiments, the RECs 60 and REs 62 communicate via Gigabit Ethernet links. There is no need for the connections to be point-to-point, as the RE synchronizes the internal clocks with the Gigabit links and measures the radio frame timing from the data packets received from the base stations according to the embodiments discussed above.

Some methods for enabling communication between the REC 60 and RE 62 are discussed in U.S. patent application Ser. No. 13/278,212, entitled "METHODS AND APPARATUSES FOR MAINTAINING SYNCHRONIZATION BETWEEN A RADIO EQUIPMENT CONTROLLER AND AN ITEM OF RADIO EQUIPMENT," now U.S. Pat. No. 8,599,827 B2, issued Dec. 3, 2013. Specifically, the REC 60 measures the transit delay between the base station's CPRI transmit reference point (BFN@TRP) and the ARP of RE 62. The downlink and uplink delays are measured separately using one correlation measurement for downlink and one for uplink. The REC 60 uses this delay measurement data to compute the delay compensation it applies to the downlink path and the data it must provide to the RE 62 for it to apply uplink delay compensation.

Additionally, the RECs 60 may not be physically located together. The RECs 60 may be located in separate locations, or there may be some number of them located in one location while others are located in one or more other locations. This creates the additional problem that the RECs 60 must be synchronized with each other. For instance, if multiple RECs 60 are working together (referred to herein as a pool of RECs) to send data to one or more REs 62, then those transmissions will need to arrive at the one or more REs 62 at the same time, within the appropriate tolerances. This may be accomplished using methods similar to those discussed above where a first REC 60, referred to herein as a master REC 60 will cause another REC 60, referred to herein as a target REC 60 to become aligned or synchronized with the master REC 60.

Figure 6:
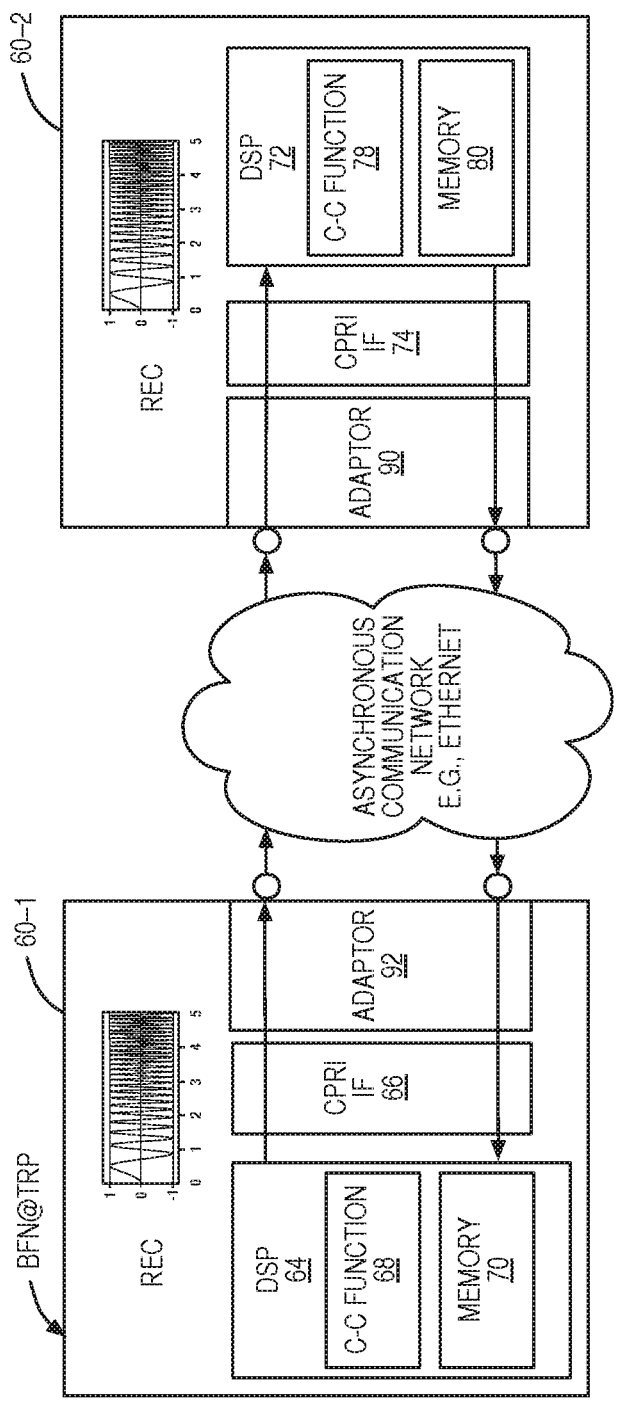
FIG. 6 illustrates the operation of a master REC and a target REC connected via an asynchronous communication network to measure the end-to-end uplink path delay according to some embodiments of the present disclosure.

In this regard, FIG. 6 illustrates the operation of a master REC 60-1 and a target REC 60-2 connected via an asynchronous communication network to measure the radio interface frame timing offset for the target REC 60-2 according to some embodiments of the present disclosure. In particular, FIG. 6 illustrates the operation of the master REC 60-1 and the target REC 60-2 to measure the radio interface frame timing offset for the target REC 60-2. As illustrated, the Digital Signal Processor (DSP) 72 of the target REC 60-2 provides a synchronization signal to the CPRI interface 74.

While this embodiment uses CPRI, the present disclosure is not limited thereto. These systems and methods are equally applicable to other radio interfaces or other ways of communicating between RECs. In this embodiment, the CPRI interface 74 is connected to an adaptor 90 which is used to interact with the asynchronous communication network. In other embodiments, the adaptor 90 may be an external component not included within the REC 60-2. Also, in some embodiments, the adaptor 90 and the CPRI interface 74 of the REC 60-2 may instead be a single communication interface operable to communicate via the asynchronous communication network.

A cross-correlation function 78 of the DSP 72 can cross-correlate a synchronization signal received from the master REC 60-1 via the adaptor 90 connected to the CPRI interface 74 and a reference synchronization signal (e.g., stored in a memory 80 or computed by the DSP 72 or other component) to thereby determine a phase difference between the synchronization signal received from the master REC 60-1 and the reference synchronization signal. This phase difference is then converted to a time delay.

The master REC 60-1 of FIG. 6 contains similar functionality where, as illustrated, the DSP 64 of the master REC 60-1 provides a synchronization signal to the CPRI interface 66. In this embodiment, the CPRI interface 66 is connected to an adaptor 92 which is used to interact with the asynchronous communication network. In other embodiments, the adaptor 92 may be an external component not included within the master REC 60-1. Also, in some embodiments, the adaptor 92 and the CPRI interface 66 of the master REC 60-1 may instead be a single communication interface operable to communicate via the asynchronous communication network. A cross-correlation function 68 of the DSP 64 can cross-correlate a synchronization signal received from the target REC 60-2 via the adaptor 92 connected to the CPRI interface 66 and a reference synchronization signal (e.g., stored in a memory 70 or computed by the DSP 64 or other component) to thereby determine a phase difference between the synchronization signal received from the target REC 60-2 and the reference synchronization signal. This phase difference is then converted to a time delay.

Figure 7A:
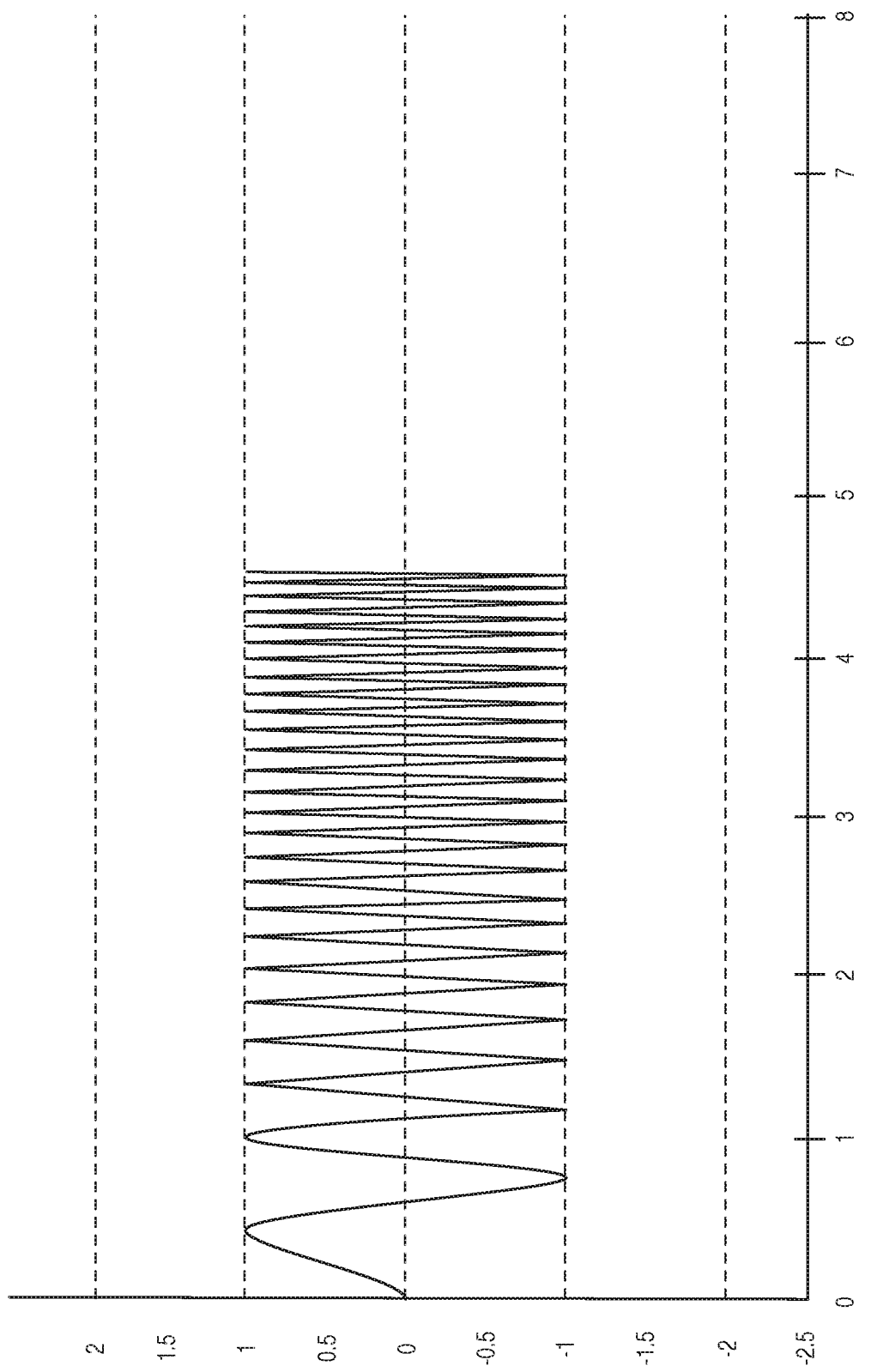
FIG. 7A illustrates an exemplary synchronization signal where a chirped sine wave has a frequency that varies substantially continuously, according to some embodiments of the current disclosure.
Figure 7B:
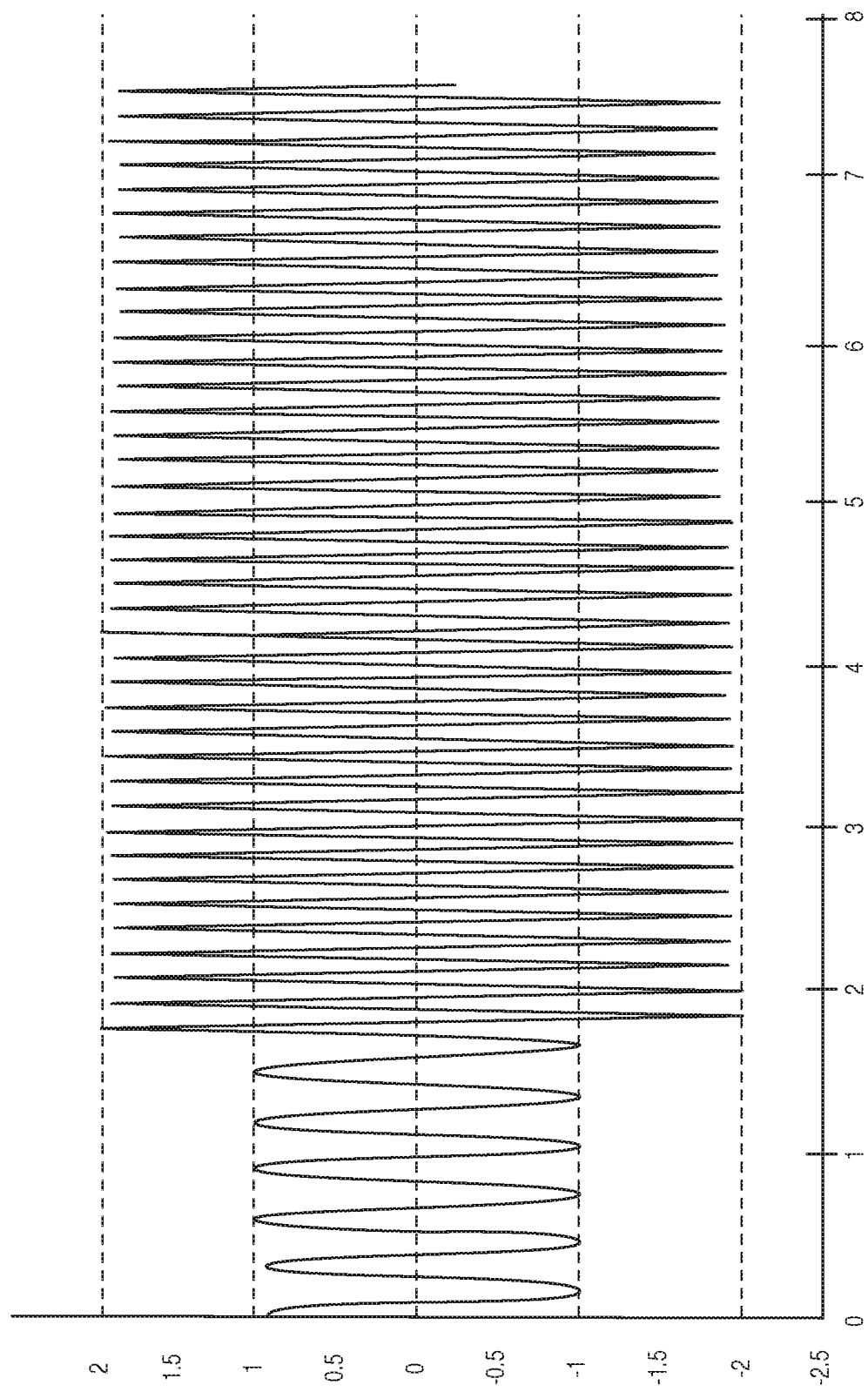
FIG. 7B illustrates another exemplary synchronization signal where a chirped sine wave has a frequency and amplitude that are stepped, according to some embodiments of the current disclosure.

As used herein, a synchronization signal is any signal which can be used to determine a time delay between the time of transmission and the time of reception. In some embodiments, this is accomplished by using signals which can be cross-correlated with a reference signal to produce a phase shift. This phase shift can then be used to compute a time difference. Two examples of such signals are illustrated in FIGS. 7A and 7B. FIG. 7A illustrates an exemplary synchronization signal where the synchronization signal is a chirped sine wave having a frequency that varies substantially continuously, according to some embodiments of the current disclosure. FIG. 7B illustrates another exemplary synchronization signal where the synchronization signal is a chirped sine wave having a frequency and amplitude that are stepped, according to some embodiments of the current disclosure. In some implementations, the frequency and amplitude stepped sine wave of FIG. 7B provides phase alignment to a higher resolution than the linearly increasing frequency chirped sine wave of FIG. 7A. Note that these are non-limiting examples and the systems and methods described herein are equally applicable to any other synchronization signal.

Figure 8:
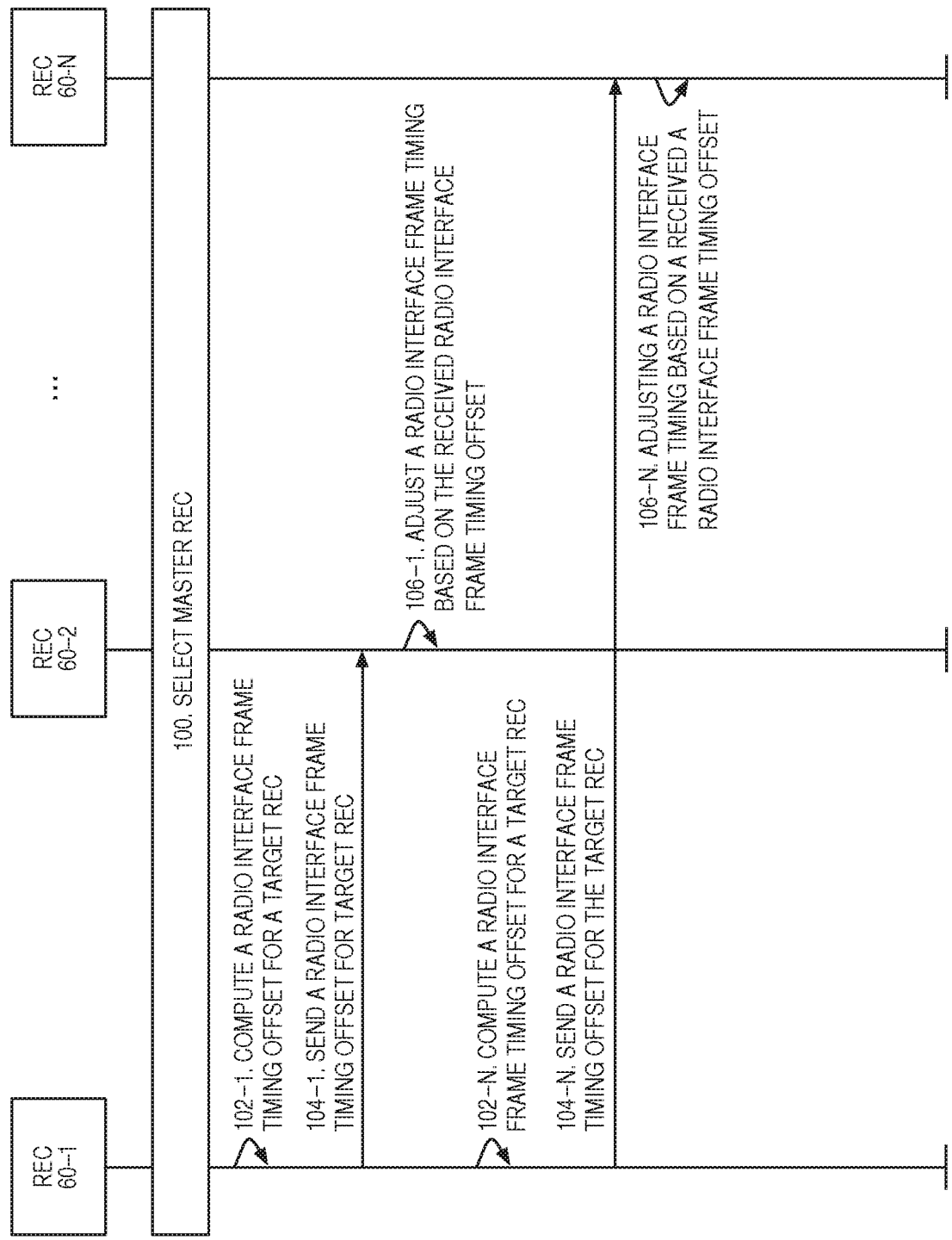
FIG. 8 illustrates the operation of multiple RECs to align a radio interface frame timing reference of the RECs, according to some embodiments of the present disclosure.

FIG. 8 illustrates the operation of multiple RECs 60 to align a radio interface frame timing reference of the RECs 60, according to some embodiments of the present disclosure. An optional first step may be to select a master REC 60 (step 100). In some embodiments, this may not be necessary as there may be an REC 60 configured to be the master REC 60. However, in other embodiments, the selection may be made using a combination of information provided by the RECs 60 and information available to other network nodes. Some of these embodiments will be discussed in more detail in regard to FIG. 9. Without lack of generality, the remainder of this discussion will assume that REC 60-1 is the master REC 60-1 and the REC 60-2 through REC 60-N are target RECs 60-2 through 60-N. The master REC 60-1 computes a radio interface frame timing offset for the target REC 60-2 (step 102-1). This computation may be accomplished using any of the methods discussed above, and a specific embodiment will be discussed in more detail in relation to FIG. 10. The master REC 60-1 then sends the radio interface frame timing offset for the target REC 60-2 to the target REC 60-2 (step 104-1). The specifics of this transmission depend on how the two RECs 60 are connected. After receiving the radio interface frame timing offset, the target REC 60-2 adjusts its radio interface frame timing based on the received radio interface frame timing offset (step 106-1). How this adjustment is made is dependent on the implementation of the target REC 60-2 and any other information the target REC 60-2 may use to determine such an adjustment.

In some embodiments, the master REC 60-1 may repeat these steps for additional target RECs 60-N or perform any of these steps in parallel. FIG. 8 shows that the master REC 60-1 computes a radio interface frame timing offset for the target REC 60-N (step 102-N). The master REC 60-1 then sends the radio interface frame timing offset for the target REC 60-N to the target REC 60-N (step 104-N). After receiving the radio interface frame timing offset, the target REC 60-N adjusts its radio interface frame timing based on the received radio interface frame timing offset (step 106-N).

Figure 9:
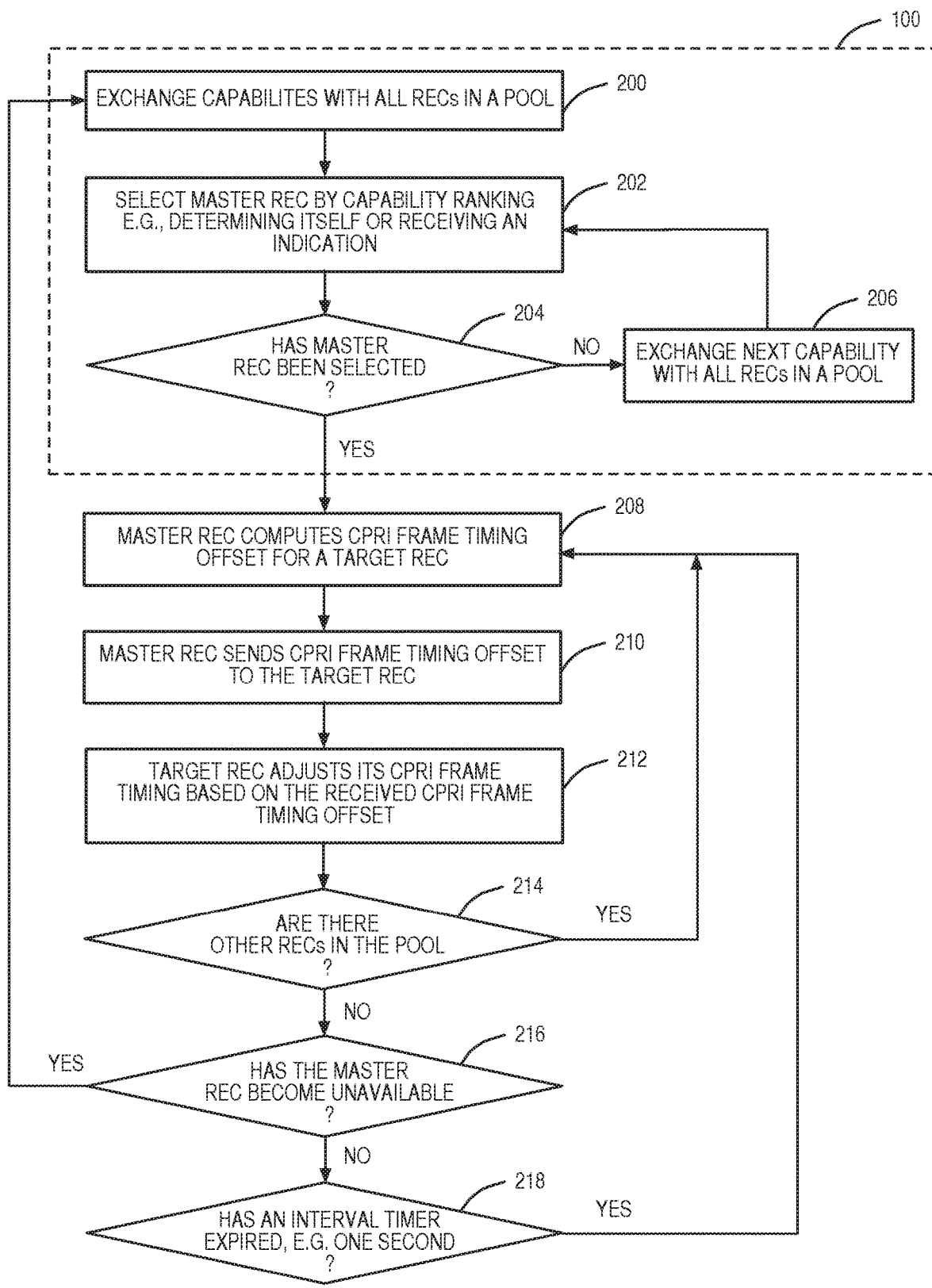
FIG. 9 also illustrates the operation of multiple RECs to align a radio interface frame timing reference of the RECs, according to some embodiments of the present disclosure.

FIG. 9 also illustrates the operation of multiple RECs 60 to align a radio interface frame timing reference of the RECs 60, according to some embodiments of the present disclosure. Also, although some steps are discussed as being performed by a specific node, the steps can generally be performed by any suitable node. FIG. 9 illustrates one possible implementation of step 100 for selecting the master REC 60-1. Specifically, the RECs 60 in a pool of RECs 60 exchange capabilities with one another (step 200). Alternatively, the RECs 60 all send their capabilities to some node that will select the master REC 60-1. These capabilities can include anything that would perhaps make an REC 60 a better candidate to be the master REC 60-1. For instance, the capabilities may include, but are not limited to, processing power, an amount of memory available, speed or quality of a network connection, and/or a location in the network topology. Next, the master REC 60-1 can be selected based on (e.g., by ranking) the capabilities (step 202). In some embodiments, this involves selecting the REC 60 with the best capability as the master REC 60-1. In some embodiments, the RECs 60 use a common algorithm to each determine whether or not the selected REC is the master REC 60-1. In this manner, the REC 60 with, e.g., the best capability, selects itself as the master REC 60-1, whereas all other RECs 60 do not select themselves as the master REC 60-1. In other embodiments, the capabilities of the RECs 60 are examined by some node (e.g., one of the RECs 60), where this node selects the master REC 60-1 and sends an indication to the master REC 60-1 that it is the master. In other words, in some embodiments, the master REC 60-1 receives an indication from some other node indicating that it is the master REC 60-1.

In some cases, the selection of the master REC 60-1 fails. This may be because a consensus was not reached or perhaps there is a tie when ranking a first capability. In any of these situations, it can be determined if the master REC 60-1 has been selected (step 204). If it has been selected, this part of the method is completed and the method may continue on. Otherwise, if the master REC 60-1 has not been selected, the RECs 60 may exchange additional capabilities with all RECs 60 in the pool of RECs 60 (step 206) and the process returns to step 202 to select the master REC 60-1 based on the additional capabilities. Note that this is just one example way to select the master REC 60-1 and the present disclosure is not limited thereto.

Once the master REC 60-1 is selected, or is already known, the master REC 60-1 computes a CPRI frame timing offset for the target REC 60-2 (step 208). Similarly to step 102, this computation may be accomplished using any of the methods discussed above, and a specific embodiment will be discussed in more detail in relation to FIG. 10. The master REC 60-1 then sends the CPRI frame timing offset for the target REC 60-2 to the target REC 60-2 (step 210). After receiving the CPRI frame timing offset, the target REC 60-2 adjusts its CPRI frame timing based on the received CPRI frame timing offset (step 212). Next, it is determined if there are other target RECs 60 in the pool of RECs 60 that should be synchronized (step 214). If there are, the process returns to step 208 and the master REC 60-1 repeats the process of computing and sending the CPRI frame timing offset to the additional target RECs 60.

There may be instances when the master REC 60-1 may become unavailable to perform the functions of the master REC 60-1. This may occur because of a hardware, software, and/or communications failure. In some embodiments, this may also be due to a decrease in resources at the master REC 60-1 that prevents it from properly synchronizing the target RECs 60. These are merely non-limiting examples, and the criteria for being unavailable may be implementation specific. If it is determined that the master REC 60-1 has become unavailable (step 216), the process may return to step 200 to select a new master REC 60-1. In some embodiments, the determination that a master REC 60-1 is unavailable is made by one of the target RECs 60 or by some other node. In some embodiments, such as when the master REC 60-1 is being intentionally powered down, the master REC 60-1 may determine that it is going to be unavailable and trigger the selection of a new master REC 60-1. Similarly, there may be some other procedure for selecting the new master REC 60-1 or there may already be enough information from a previous selection step to determine which REC 60 should become the new master REC 60-1.

Additionally, since the radio interface frame timing offset may change over time due to various conditions, some embodiments include a periodic recalculation of the radio interface frame timing offset. For instance, as shown in FIG. 9, it may be determined that an internal timer has expired (step 218). If the timer has expired, the process returns to step 208 and the master REC 60-1 again computes and sends an updated CPRI frame timing offset to the one or more target RECs 60. In some embodiments, the timer can be set to a value of one second. Such a relatively long timer may be appropriate due to the slowly varying nature of the offsets and transit delays. In other embodiments, the timer may be variable and may be based on how much change is detected between each calculation. That is, if the offsets and transit delays are changing more rapidly, then the timer may be set to a smaller value.

Figure 10:
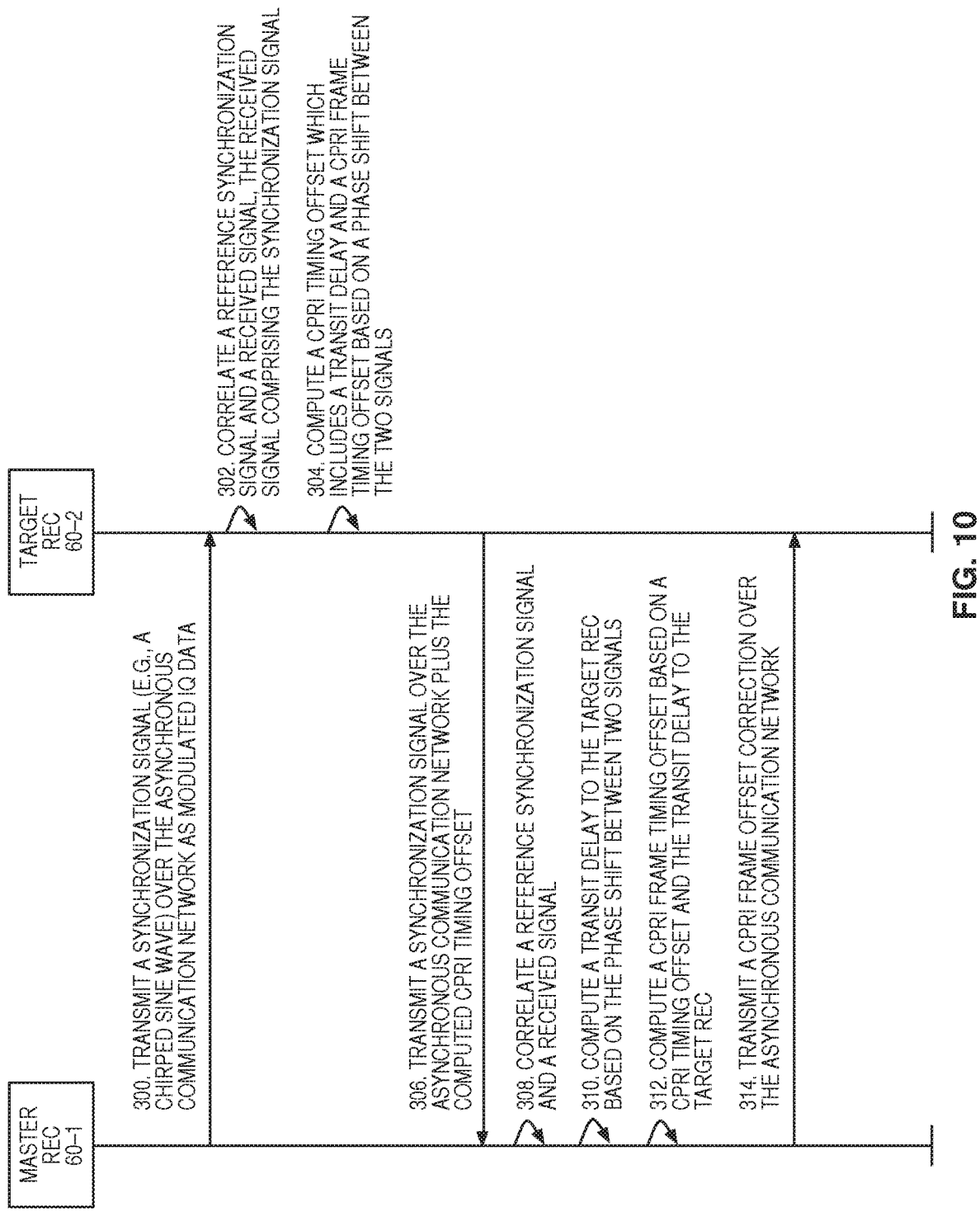
FIG. 10 illustrates the operation of a master REC and a target REC to compute a radio interface frame offset correction, according to some embodiments of the present disclosure.

FIG. 10 illustrates the operation of a master REC 60-1 and a target REC 60-2 to compute a radio interface frame offset correction, according to some embodiments of the present disclosure. The master REC 60-1 transmits a synchronization signal (e.g., a chirped sine wave) over the asynchronous communication network as modulated IQ data (step 300). The target REC 60-2 correlates a reference synchronization signal and a received signal, the received signal including the synchronization signal (step 302). In some embodiments, this reference synchronization signal is stored at the target REC 60-2, while in other embodiments it is calculated at the target REC 60-2.

The target REC 60-2 computes a CPRI timing offset which includes a transit delay and a CPRI frame timing offset based on a phase shift between the two signals (step 304). At this point, the target REC 60-2 does not know which portion of the CPRI timing offset is due to the transit delay and which part is caused by the difference in clocks, the CPRI timing offset. As such, the target REC 60-2 transmits a synchronization signal over the asynchronous communication network plus the computed CPRI timing offset to the master REC 60-1 (step 306). This synchronization signal may be the same signal used in the other transmission, or may be different. The master REC 60-1 correlates a reference synchronization signal with the received signal to determine a phase shift between the signals (step 308). The master REC 60-1 computes a transit delay to the target REC 60-2 based on the phase shift between the two signals (step 310). Again, in some embodiments, this delay includes both the transit delay and the CPRI timing offset. The master REC 60-1 then computes the CPRI frame timing offset based on the CPRI timing offset and the transmit delay to the target REC 60-2 (step 312). In some embodiments, this is accomplished by assuming that the transit delays between the two RECs 60 are symmetrical. In that case, the difference between the calculated delays based on the different phase shifts is caused by the CPRI frame timing offset (going both ways).

The master REC 60-1 then transmits a CPRI frame offset correction over the asynchronous communication network to the target REC 60-2 (step 314). This CPRI frame offset correction may vary depending on the implementation. In some embodiments, this correction only serves to synchronize the two clocks and therefore only corrects for the CPRI frame timing offset. In other embodiments, the correction may also compensate for transit delay.

Figure 11:
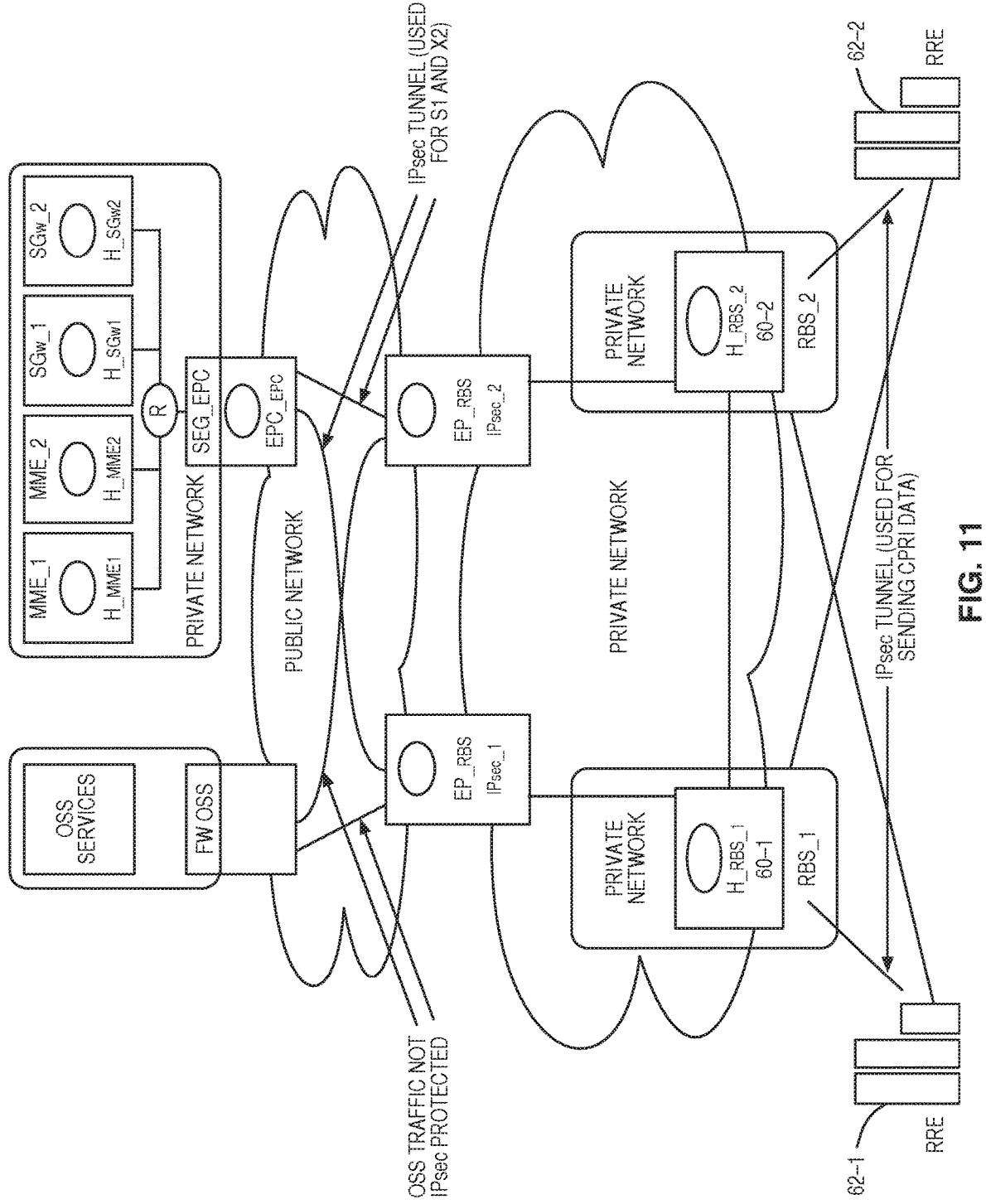
FIG. 11 illustrates a network diagram where the RECs and REs of FIGS. 5 and 6 may be used according to some embodiments of the present disclosure.

FIG. 11 illustrates a network diagram where the RECs 60 and REs 62 of FIGS. 5 and 6 may be used according to some embodiments of the present disclosure. FIG. 11 illustrates a wireless network in which the RECs 60 are located centrally in one or more Radio Base Station (RBS) such as the Enterprise RBS (EP_RBS), and the REs 62 are attached remotely as Remote Radio Equipment (RRE) over IPsec tunnels which carry the CPRI control and IQ data in Ethernet packets. IPsec supports network-level peer authentication, data origin authentication, data integrity, data confidentiality (encryption), and replay protection. In this embodiment, the IPsec tunnels are responsible for delivering the asynchronous packet flow comprising CPRI basic frames and overhead information.

High Quality of Service (QoS) ensures that the asynchronous packet order is preserved and delay is minimized through data switches. FIG. 11 also shows IPsec tunnels being used to transport X2 communications between various RBSs. IPsec tunnels are also used for S1 communications between RBSs and nodes in the core network such as one or more Mobility Management Entities (MMEs) and one or more Serving Gateways (SGws). In contrast, the Operations Support System (OSS) services may not need to be protected with IPsec.

FIG. 11 shows a mixture of public networks and private networks, but other embodiments may use only one or the other, or may use a different configuration of which connections are made using which type of network. For instance, the MME_1, MME_2, SGw_1, and SGw_2 are shown as being in a private network. That private network includes a router that interfaces with a Segregated Evolved Packet Core (SEG_EPC) which is in communication with a public Evolved Packet Core (EPC) labeled EPC_EPC which is part of a public network. Similarly, the OSS services are shown communicating with the public network via the Forward OSS (FW OSS).

As is shown in FIG. 11, REC 60-1 includes an IPsec tunnel to both RE 62-1 and RE 62-2. Similarly, REC 60-2 also includes an IPsec tunnel to both RE 62-1 and RE 62-2. In this way, RECs 60-1 and 60-2 could work as a pool of RECs 60 to cooperatively transmit signals to RE 62-1 or any other RE 62, according to some embodiments of the present disclosure. Also, the same REC 60 can be used to transmit signals to multiple REs 62, according to some embodiments of the present disclosure. These shared transmissions may serve many purposes such as power sharing or coordinated transmissions such as Multimedia Broadcast Multicast Services (MBMS) transmissions. Another benefit that some embodiments may benefit from is the ability to compensate for the loss of equipment. For instance, if one REC 60 becomes disabled or otherwise unavailable, another REC 60 may be able to take over and transmit signals to one or more REs 62 that the unavailable REC 60 would have used.

Figure 12:
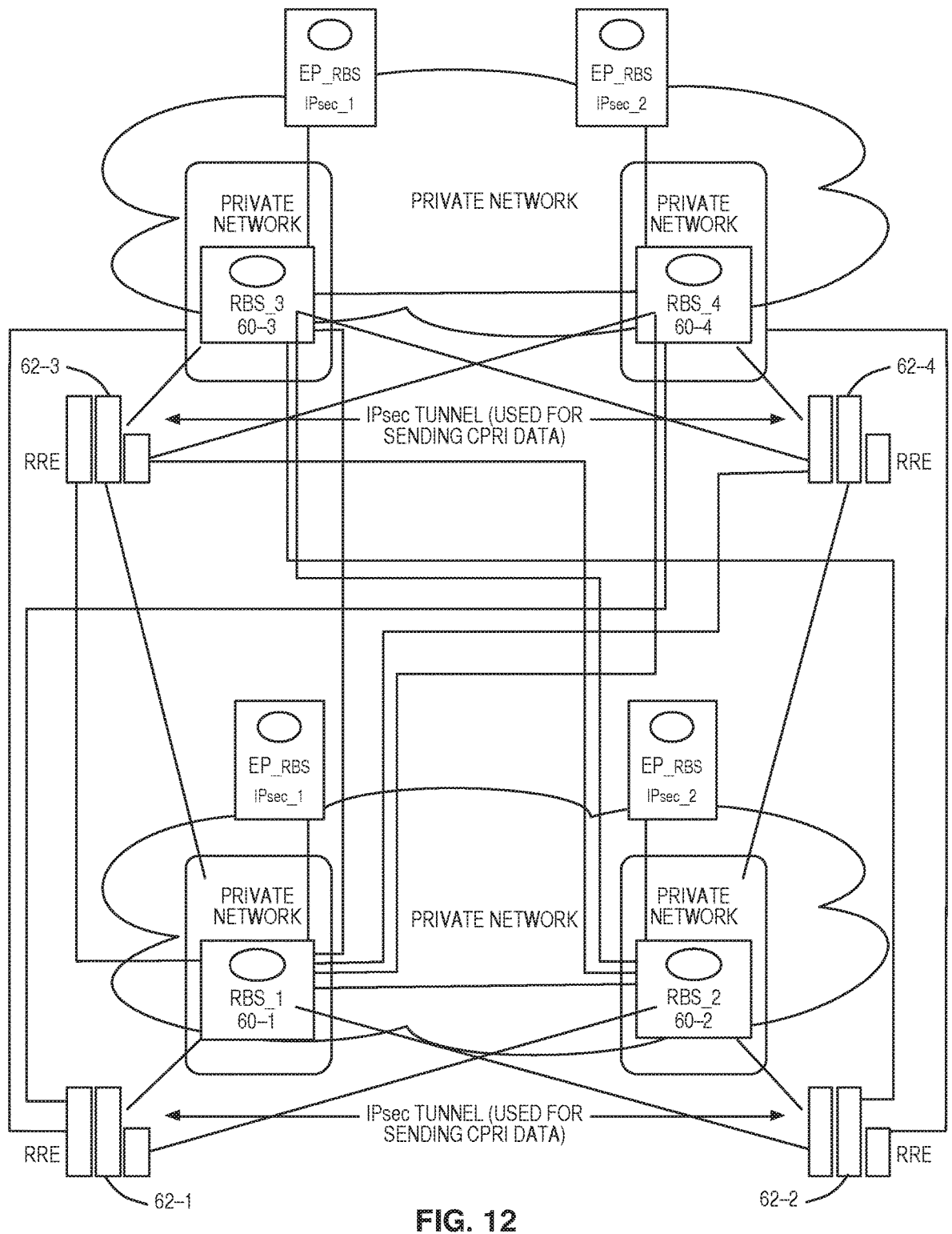
FIG. 12 illustrates another network diagram where the RECs and REs of FIGS. 5 and 6 may be used according to some embodiments of the present disclosure.

FIG. 12 illustrates another network diagram where the RECs 60 and REs 62 of FIGS. 5 and 6 may be used according to some embodiments of the present disclosure. Many of the elements in this figure are similar to the ones described in relation to FIG. 11. As such, repetitive descriptions are omitted. FIG. 12 includes multiple RECs 60 and REs 62 which are not collocated. For instance, RECs 60-1 and 60-2 are shown as being part of the same private network, while RECs 60-3 and 60-4 are shown as being part of a separate private network. In some embodiments, these may each correspond to a server farm that supports many such nodes. As shown in FIG. 12, each of these RECs 60 are connected with IPsec tunnels to enable them to communicate with each other in any of the ways discussed above. For instance, REC 60-1 could be the master REC 60-1 and could operate to synchronize the CPRI frame timing of the other three RECs 60 with its own timing. This would allow any combination of the RECs 60 to communicate with any combination of the REs 62 via the IPsec tunnels shown in FIG. 12. This is merely one example implementation and the present disclosure is not limited thereto.

Figure 13:
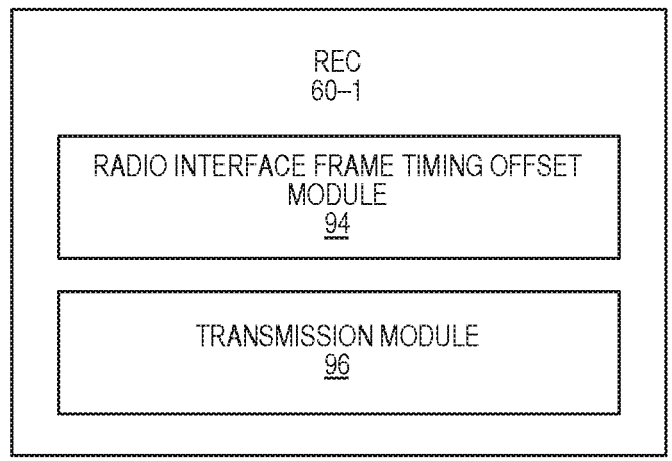
FIG. 13 is a block diagram of a master REC with modules, according to some embodiments of the present disclosure.

FIG. 13 is a block diagram of a master REC 60-1 with modules, each of which is implemented in software, according to some embodiments of the present disclosure. Master REC 60-1 includes a radio interface frame timing offset module 94 operative to compute a radio interface frame timing offset for a target REC 60-2 and a transmission module 96 operative to send the radio interface frame timing offset to the target REC 60-2 via an asynchronous communication network.

Figure 14:
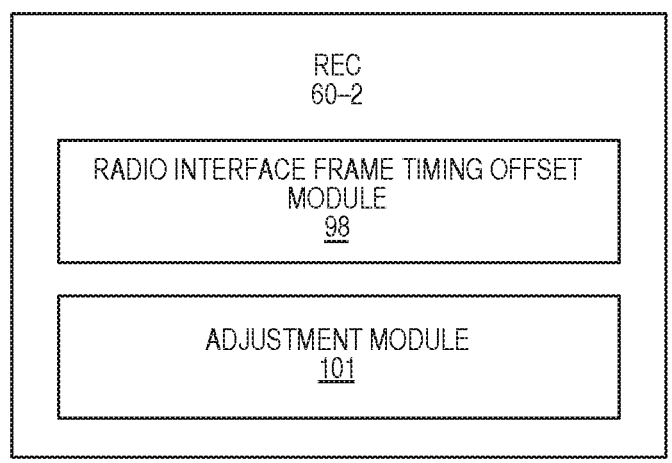
FIG. 14 is a block diagram of a target REC with modules, according to some embodiments of the present disclosure.

FIG. 14 is a block diagram of a target REC 60-2 with modules, each of which is implemented in software, according to some embodiments of the present disclosure. Target REC 60-2 includes a radio interface frame timing offset module 98 operative to receive a radio interface frame timing offset from a master REC 60-1 via an asynchronous communication network and an adjustment module 101 operative to adjust a radio interface frame timing of the target REC 60-2 based on the received radio interface frame timing offset.

In some embodiments, a computer program including instructions which, when executed by at least one processor, cause the at least one processor to carry out the functionality of the REC 60 (e.g., the master REC 60-1 or the target REC 60-2) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium.

The following acronyms are used throughout this disclosure.

ARP Antenna Reference Point
BFN@TRP Basic Frame Transmit Reference Point
C-C Cross-Correlation
CPRI Common Public Radio Interface
DL Downlink
DSP Digital Signal Processor
EPC Evolved Packet Core
EP_RBS Enterprise Radio Base Station
FDD Frequency Division Duplex
FW OSS Forward Operation Support System
IPsec Internet Protocol Security
IQ In-phase and Quadrature
kHz Kilohertz
MBMS Multimedia Broadcast Multicast Services
MHz Megahertz
MME Mobility Management Entity
ms Millisecond
ns Nanosecond
OSS Operations Support System
QoS Quality of Service
RBS Radio Base Station
RE Radio Equipment
REC Radio Equipment Controller
RF Radio Frequency
RRE Remote Radio Equipment
RX Receive Port
SEG_EPC Segregated Evolved Packet Core
SGw Serving Gateway
TDD Time Division Duplex
TX Transmit Port
UL Uplink Those skilled in the art will recognize improvements and modifications to the embodiments of the present disclosure. All such improvements and modifications are considered within the scope of the concepts disclosed herein and the claims that follow.

What is claimed is:

1. A Radio Equipment Controller, REC, comprising:
a communication interface configured to communicatively couple the REC to at least one other REC and a Radio Equipment, RE, via an asynchronous communication network; and
circuitry configured to:
exchange information with the at least one other REC indicative of at least one capability of each of the REC and the at least one other REC;
determine that the REC is a master REC based on the values of the at least one capability;
compute a radio interface frame timing offset for a target REC of the at least one other REC relative to a reference time for the REC and the at least one other REC, wherein being configured to compute the radio interface frame timing offset for the target REC of the at least one other REC comprises being configured to:
transmit to the target REC a synchronization signal over the asynchronous communication network as modulated IQ data;
receive from the target REC a synchronization signal over the asynchronous communication network plus a computed radio interface timing offset from the master REC which includes a transit delay to the target REC and a radio interface frame offset;
correlate a reference synchronization signal and a received signal from the target REC to compute a transit delay to the target REC; and
send the radio interface frame timing offset to the target REC via the asynchronous communication network to adjust the radio interface frame timing of the target REC.

2. The REC of claim 1 wherein the circuitry is further configured to, prior to computing the radio interface frame timing offset, receive an indication that the REC is a master REC.

3. The REC of claim 1 further configured to:
determine if an additional REC in the at least one other REC should be time-aligned; and
if an additional REC should be time-aligned:
compute a radio interface frame timing offset for the additional REC; and
send the radio interface frame timing offset to the additional REC via the asynchronous communication network.

4. The REC of claim 1 further configured to:
determine if an interval timer has expired; and
if the interval timer has expired:
compute an updated radio interface frame timing offset for the target REC of the at least one other REC; and
send the updated radio interface frame timing offset to the target REC via the asynchronous communication network.

5. The REC of claim 4 wherein the interval timer is 1 second.

6. The REC of claim 1 wherein the radio interface frame timing offset is a Common Public Radio Interface, CPRI, frame timing offset.

7. The REC of claim 1 wherein at least one of the synchronization signals is a chirped sine wave.

8. The REC of claim 7 wherein the chirped sine wave has a frequency that varies continuously.

9. The REC of claim 7 wherein the chirped sine wave has a frequency and amplitude that are stepped.

10. The REC of claim 1 wherein the asynchronous communication network is an Ethernet network.

11. The REC of claim 10 wherein the Ethernet network is encrypted.

12. The REC of claim 11 wherein the Ethernet network includes an Internet Protocol Security, IPsec, tunnel.

13. A Radio Equipment Controller, REC, comprising:
a communication interface configured to communicatively couple the REC to at least one other REC and a Radio Equipment, RE, via an asynchronous communication network; and
circuitry configured to:
exchange information with the at least one other REC indicative of at least one capability of each of the REC and the at least one other REC and select a master REC based on values of the at least one capability;
receive, from the master REC, a synchronization signal over the asynchronous communication network as modulated IQ data;

correlate a reference synchronization signal and a received signal from the master REC on the asynchronous communication network, the received signal comprising the synchronization signal;

compute a radio interface timing offset which includes a transit delay and a radio interface frame timing offset based on a phase shift between the two signals;

transmit to the master REC the synchronization signal over the asynchronous communication network plus the computed radio interface timing offset;

receive a radio interface frame timing offset from the master REC relative to a reference time for the REC and the master REC via the asynchronous communication network; and adjust a radio interface frame timing of the REC based on the received radio interface frame timing offset.

14. The REC of claim 13 wherein the circuitry is further configured to, prior to receiving the radio interface frame timing offset, select the master REC from the at least one other REC.

15. The REC of claim 13 further configured to:
transmit an indication to the master REC indicating that the master REC is the master REC.

16. The method of claim 13 further configured to: determine if the master REC has become unavailable; and
if the master REC has become unavailable, select a new master REC from the plurality of RECs.

17. The REC of claim 13 wherein the radio interface frame timing offset is a Common Public Radio Interface, CPRI, frame timing offset.

* * * * *